United States Patent
Blackham et al.

(10) Patent No.: US 7,218,328 B2
(45) Date of Patent: May 15, 2007

(54) IMAGE DISPLAY APPARATUS

(75) Inventors: Geoffrey Howard Blackham, Hassocks (GB); Ian Murdoch Macpherson, Steyning (GB); Adam Neale, Steyning (GB)

(73) Assignee: SEOS Limited, West Sussex (GB)

( * ) Notice: Subject to any disclaimer, the term of this patent is extended or adjusted under 35 U.S.C. 154(b) by 336 days.

(21) Appl. No.: 09/811,227

(22) Filed: Mar. 16, 2001

(65) Prior Publication Data
US 2002/0130875 A1   Sep. 19, 2002

(51) Int. Cl.
*G09G 5/36* (2006.01)

(52) U.S. Cl. .............. 345/545; 345/698; 345/699; 345/634; 345/630

(58) Field of Classification Search .............. 345/698, 345/634, 428, 636, 1.3, 630, 589, 629, 699, 345/628, 545, 3.4; 348/335
See application file for complete search history.

(56) References Cited

U.S. PATENT DOCUMENTS

| | | | |
|---|---|---|---|
| 4,028,725 A | 6/1977 | Lewis | |
| 4,348,186 A | 9/1982 | Harvey et al. | |
| 4,439,157 A | 3/1984 | Breglia et al. | |
| 4,479,784 A | 10/1984 | Mallinson et al. | |
| 5,137,450 A | 8/1992 | Thomas | |
| 5,239,625 A * | 8/1993 | Bogart et al. | 395/128 |
| 5,320,534 A | 6/1994 | Thomas | |
| 5,326,266 A | 7/1994 | Fisher et al. | |
| 5,487,665 A * | 1/1996 | Lechner et al. | 434/44 |
| 5,523,769 A * | 6/1996 | Lauer et al. | 345/1 |
| 5,600,347 A * | 2/1997 | Thompson et al. | 345/127 |
| 5,625,765 A * | 4/1997 | Ellenby et al. | 345/633 |
| 5,686,960 A * | 11/1997 | Sussman et al. | 348/218.1 |
| 5,737,455 A * | 4/1998 | Harrington et al. | 382/284 |
| 5,940,117 A * | 8/1999 | Hassan et al. | 348/13 |
| 6,574,352 B1* | 6/2003 | Skolmoski | 382/103 |
| 6,734,911 B1* | 5/2004 | Lyons | 348/340 |

FOREIGN PATENT DOCUMENTS

| | | |
|---|---|---|
| EP | 0 423 930 A1 | 4/1991 |
| GB | 2 259 213 A | 3/1993 |
| JP | 410164468 A * | 6/1998 |

* cited by examiner

*Primary Examiner*—Kimbinh T. Nguyen
(74) *Attorney, Agent, or Firm*—Iandirio & Teska

(57) ABSTRACT

Image display apparatus (2) which combines low and high resolution image data in a common data format prior to display.

6 Claims, 2 Drawing Sheets

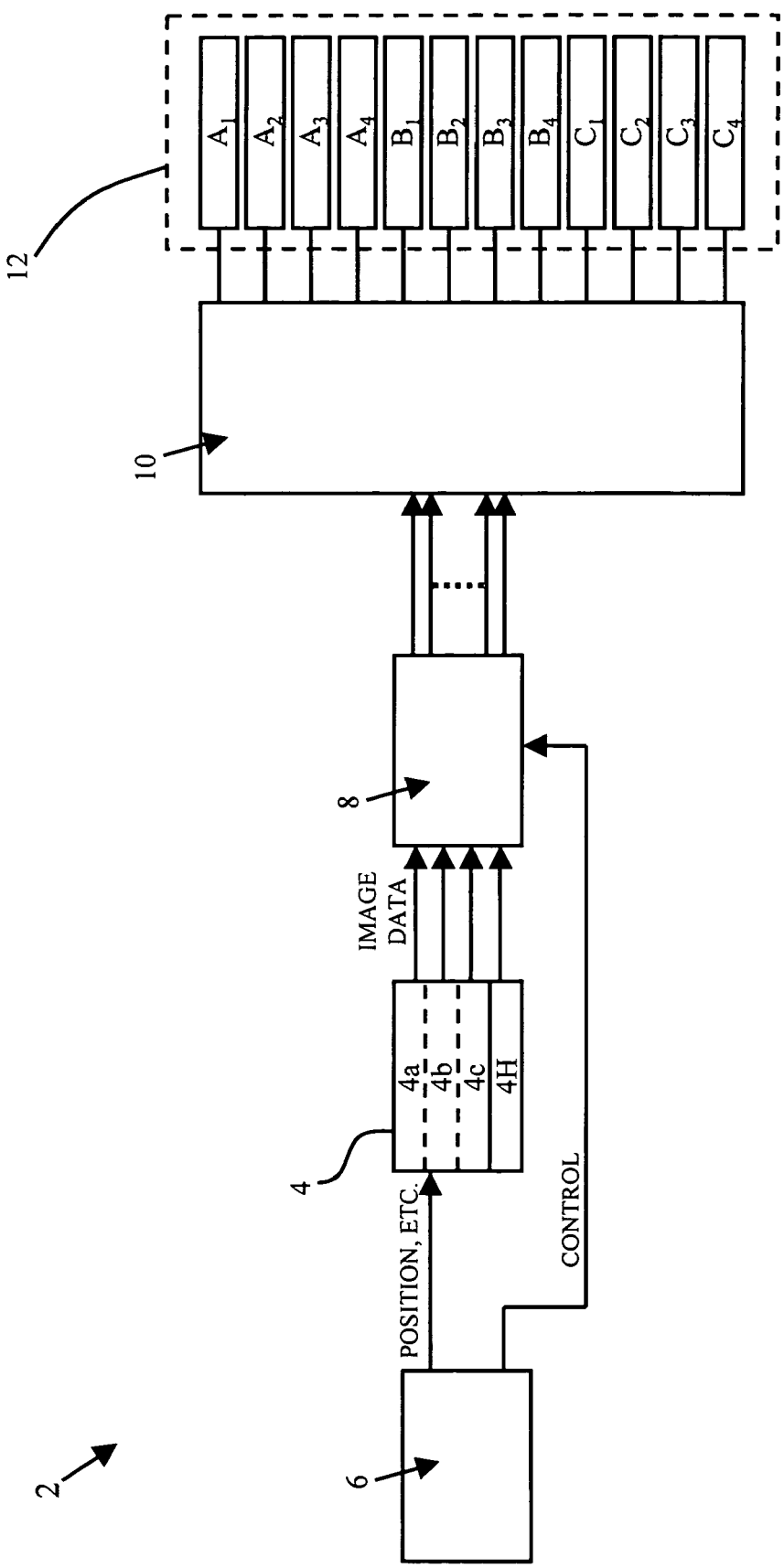

IMAGE DISPLAY APPARATUS

Figure 1:
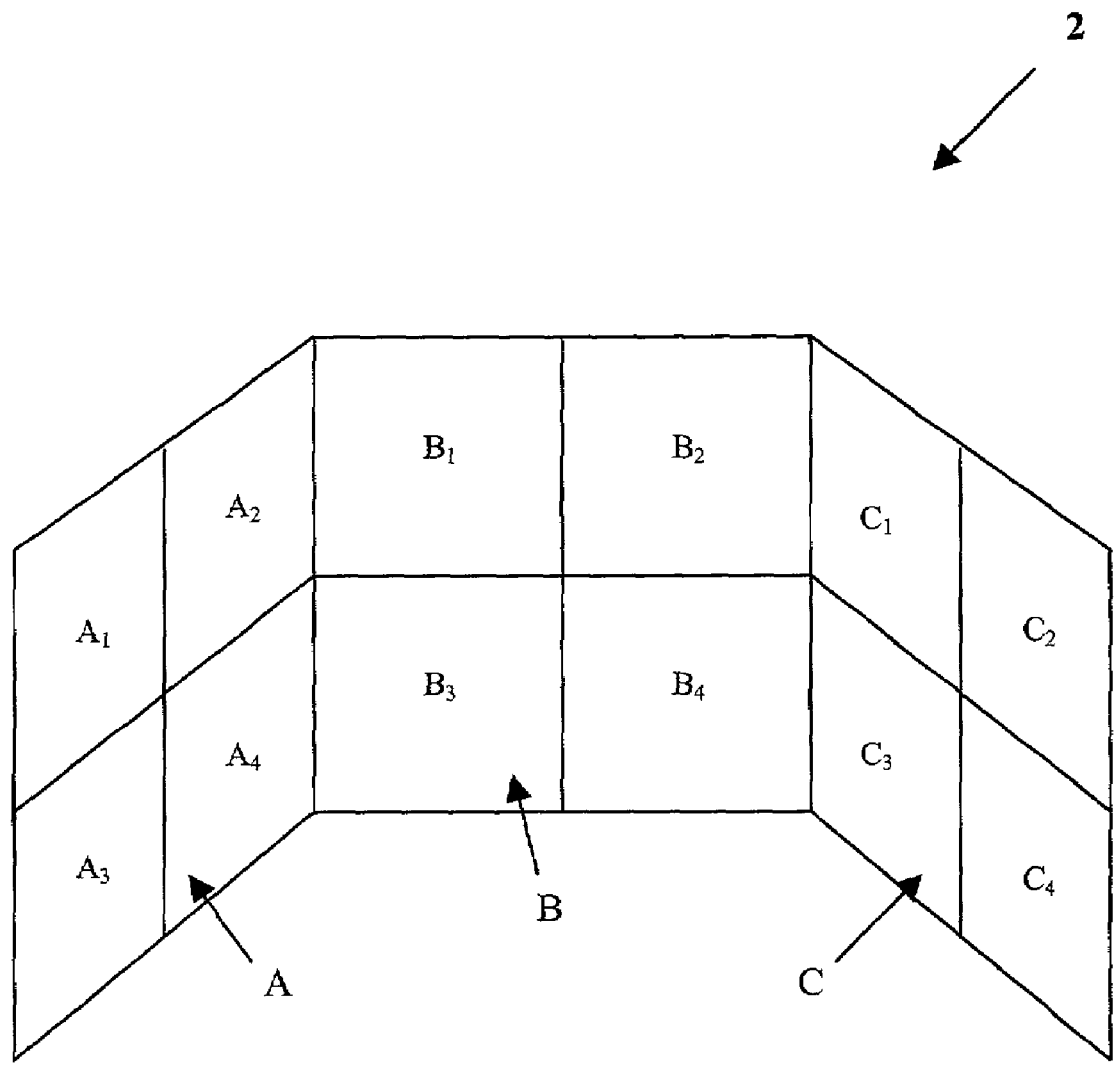

This invention relates to wide field of view visual display apparatus, for example for flight simulators. More especially, this invention relates to an improvement in displays which have a very large total field of view, a large field of regard, and one or more high resolutions areas within the total displayed field of view.

Wide field of view displays have been provided using a dome of large radius with one or more projectors projecting images on to the inside surface of the dome. With this type of apparatus, the ideal projection point is co-located with the ideal viewing point at the centre of the dome surface. However, in order to achieve a practical solution, the viewing point and/or the projection point(s) are displaced from the centre, introducing geometric and brightness distortion to the perceived image. Furthermore, the use of multiple projectors requires that the projection points of the projectors be separated, and the overall requirement is usually met by mounting the projectors away from the ideal location and providing geometry and brightness distortion at each projector to provide an undistorted image of apparent uniform brightness when viewed from the required view point.

Hitherto, it has been expensive to fill a wide field of view display with imagery. The expense is incurred both in the provision of projectors, and in the provision of image generator channels to drive multiple projectors. Various attempts have been made to alleviate this problems. These attempts have included helmet mounted area-of-interest displays, such as the CAE Electronics Company's fibre optic helmet mounted display in which a helmet mounted display provides an eye tracked area-of-interest display. The attempts have also included off-head area-of-interest displays such as the eye line of sight responsive wide angle visual apparatus described in U.S. Pat. No. 4,479,784, in which a helmet mounted oculometer is used to steer a foveal projector to produce a high resolution insert at the viewer's point of regard, with a low resolution peripheral view being projected via a separate, low resolution, projector.

As an alternative to the use of a large dome with projection systems, a display for advance research and training was developed and is described in U.S. Pat. No. 5,137,450. The display for advanced research and training uses a number of pentagonal shaped flat back projection screens to form a partial dodecahedron surrounding the simulator pilot, the back projection screens being positioned approximately 1 meter from the design eyepoint and joined together at their edges with a 10 mm wide dark separation band, it being asserted that this dark separation band does not cause distraction. Projectors mounted outside the dodecahedron, one per facet, project images on to the back projection screens to produce a wide angled image for the simulator pilot. This use of one projector per facet produces fairly low resolution imagery.

The display for advanced research and training has been further developed and is described in U.S. Pat. No. 5,320,534. This further development involves the addition of a helmet mounted high resolution area-of-interest display to be used in conjunction with the low resolution background image of the original display for advanced research and training.

A further development of the approach utilised in the display for advanced research and training has been to use display screens close to the viewpoint. This further development is disclosed in U.S. Pat. No. 5,487,665. The development involves a multifaceted dome emulation with both a background and a target projector per facet, the projectors being mounted outside the projection screen. Both projectors cover the whole facet optically, and the background projector projects a low resolution image over the entire facet. Targets, produced by the image generation system at high resolution, are each displayed as a mini-shrunken raster on the target projector, with each shrunken raster being positioned on the projector tube face to position the target at the correct position on the screen facet. Such apparatus has limitations and, for example, one such limitation is that the blending of images produced by different projectors with differing resolutions always produces artefacts in the display. In addition, it is difficult to maintain accuracy in the alignment of the target projectors, and the image may jump when moving from one facet to another due to slight misalignments between the target projectors at the transition point.

It is an aim of the present invention to provide a method of operating image display apparatus with a uniform high resolution capability, in which low resolution wide field of view and high resolution narrow field of view images are able to be electronically processed into a common high resolution pixel format and blended before being displayed by very high resolution display apparatus.

Accordingly, the present invention provides a method of operating image display apparatus, which method comprises combining in a common pixel format a low resolution wide field of view image component from a first source, and a high resolution narrow field of view image component from a second source which is different from the first source, and in which the common pixel format is the pixel format of a high resolution image which forms the second source and from which the high resolution narrow field of view image component is obtained, whereby the high resolution narrow field of view image component is able to be positioned anywhere in a display obtained from the image display apparatus.

The method may be one in which a low resolution image is resampled to increase the pixel count to that of the highest resolution imagery.

The method may be one in which a low resolution image is interpolated to increase the pixel count to that of the highest resolution imagery.

The composite imagery may be stored in a frame buffer. The frame buffer may be segmented to drive a matrix of display devices.

The method may be one in which the low resolution wide field of view image component is of a background scene, and in which the high resolution narrow field of view image component is of a target.

The image display apparatus may comprise an image generator with multi-channel outputs, each channel of which may contain multiple component images with the same or differing resolutions, an image processing unit which separates the component image windows, resamples the low resolution component images to a common smaller pixel size, assembles the component images into a high resolution frame store for the display, and outputs the high resolution images to a high resolution display system. The high resolution display system may be a single high resolution device, or may be composed of a number of lower resolution display devices arranged in a matrix.

An embodiment of the invention will now be described solely by way of example and with reference to the accompanying drawings in which:

FIG. 1 shows wide angle display apparatus composed of a matrix of display devices; and FIG. 2 shows a block diagram of the apparatus.

Referring to FIG. 1, there is shown a sample representation of wide angle display apparatus 2 having three display planes ABC, with each display plane having four fixed display devices A1, A2, A3, A4 etc, mounted in the form of a matrix so as to form a continuous display. It will be appreciated that a practical system may utilise a matrix containing more display devices, and that the matrix of the display devices is not necessarily mounted to form a planar array.

Computer image generation apparatus is well known. The principals are described in "Principals of Interactive Computer Graphics", William M. Newman and Robert F. Sproull, 2nd Edition, 1981, McGraw Hill Book Company. Modern computer image generation apparatus is capable of providing multiple overlapping images with different fields of view and resolutions for display of flat or curved surfaces.

Referring to FIG. 2, there is shown a block diagram of the apparatus 2. As can be seen from FIG. 2, the apparatus 2 comprises an image generator 4 in the form of a multi-channel device in which each channel output may be composed of a single component window representing a large field of view at low resolution, or a narrower field of view at a higher resolution, or several smaller component windows representing relatively narrow fields of view.

A host computer 6 provides the image generator 4 with eyepoint position, eyepoint orientation in terms of roll, pitch and yaw and the relative orientation of each component image so that the component images may be generated.

The host computer 6 or the image generator 4 also provides control signals to an image processing unit 8 for each component image, defining location in the image generator output data stream, size, the required interpolation, and the position in the final display.

The image generator output signals are routed to the image processing unit 8 which processes the component image signals into a single output image frame store 10 for the display. The output image frame store 10 has multiple output signals which are converted to video signals to drive a matrix of display devices as indicated in FIG. 2.

High resolution component images are extracted from the image generator output data streams using the control signals to identify the components, passed through the image processing unit 8, and stored in the output frame store 10.

Low resolution component images are extracted from the image generator output data streams using the control signals to identify the components and control the processing, resampled to the same pixel size as the high resolution images, and stored in the output frame store 10. Resampling into smaller pixels can be performed by the use of a standard interpolation method, for example bi-linear interpolation, to transition the data between the pixel values produced by the image generator 4. Other interpolation equations may be used as an alternative, as well as adaptive method which depend upon the complexity of the computed image surrounding the interpolation interval. It is preferred but not essential that the lower resolution pictures are generated with a pixel size which is a multiple of the smallest pixel size used in the apparatus 2.

The output frame store 10 can be implemented in a number of ways, and one such implementation is to use a multiple-plane frame store in which different component images are stored in different planes and a one bit plane is used as a mask to select when a component is used for output. In this way, the output data stream from the output frame store 10 can be a combination of the low and high resolution images, and the high resolution component images can be positioned anywhere in the display.

A preferred display arrangement for use in the apparatus is a fixed matrix of display devices arranged to form a continuous display. For output, the output frame store 10 is preferably partitioned into sections corresponding to the display devices in the matrix to reduce the band width requirements of the individual video channels and display devices.

For simulation purposes, a component may be a low resolution background scene, or a higher resolution area of interest, for example a target, within the total scene. The image generator 4 can compute a number of components under the control of the host computer 6, and the image processing unit 8 will resample all the low resolution components to the required high resolution pixel interval and pass each component to the output frame store 10 where it will be combined with the other components to form a complete image. A component may be a target area in which the computed area is centred on the target, or may be an area of interest steered by head and/or eye movements.

It is to be appreciated that the embodiments of the invention described above with reference to the accompanying drawings have been given by way of example only and that modifications may be made.

The invention claimed is:

1. A method of operating image display apparatus, which method comprises combining electronically in a common pixel format a low resolution wide field of view image component from a first source, and a high resolution narrow field of view image component from a second source which is different from the first source, and in which the common pixel format is the pixel format of a high resolution image which forms the second source and from which the high resolution narrow field of view image component is obtained, whereby the high resolution narrow field of view image component is able to be positioned anywhere in a display obtained from the image display apparatus.

2. A method according to claim 1 in which the low resolution image is resampled to increase the pixel count to that of the highest resolution imagery.

3. A method according to claim 1 in which the low resolution image is interpolated to increase the pixel count to that of the highest resolution imagery.

4. A method according to claim 1 in which the composite imagery is stored in a frame buffer.

5. A method according to claim 4 in which the frame buffer is segmented to drive a matrix of display devices.

6. A method according to claim 1 in which the low resolution wide field of view image component is of a background scene, and in which the high resolution narrow field of view image component is of a target.

* * * * *